(12) United States Patent
McArthur

(10) Patent No.: US 9,829,401 B2
(45) Date of Patent: Nov. 28, 2017

(54) STRAIN GAUGE AND ACCELEROMETER MEASUREMENT FOR THRUST ESTIMATION

(71) Applicant: Rolls-Royce Corporation, Indianapolis, IN (US)

(72) Inventor: John McArthur, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 258 days.

(21) Appl. No.: 14/681,300

(22) Filed: Apr. 8, 2015

(65) Prior Publication Data

US 2015/0292967 A1    Oct. 15, 2015

Related U.S. Application Data

(60) Provisional application No. 61/978,352, filed on Apr. 11, 2014.

(51) Int. Cl.
*G01L 5/13*    (2006.01)
*F01D 17/04*   (2006.01)
(Continued)

(52) U.S. Cl.
CPC ............. *G01L 5/133* (2013.01); *F01D 17/04* (2013.01); *F01D 21/003* (2013.01); *F01D 25/28* (2013.01); *F02C 9/28* (2013.01); *F02C 9/32* (2013.01); *G01L 1/22* (2013.01); *G01P 15/02* (2013.01); *F05D 2200/13* (2013.01); *F05D 2220/323* (2013.01); *F05D 2240/91* (2013.01); *F05D 2260/80* (2013.01); *F05D 2260/94* (2013.01);
(Continued)

(58) Field of Classification Search
CPC ........................................................ G01L 5/133
USPC ................................... 73/114.14, 114.15
See application file for complete search history.

(56) References Cited

U.S. PATENT DOCUMENTS 3,375,712 A * 4/1968 Postma ................... G01L 5/133
                                                    73/112.04
3,401,558 A * 9/1968 Stouffer ................ G01L 1/2268
                                                    73/147
(Continued)

FOREIGN PATENT DOCUMENTS

| EP | 0342970 A2 | 11/1989 |
| EP | 0458453 A2 | 11/1991 |
| EP | 1007926 A1 | 6/2000 |

OTHER PUBLICATIONS

Search Report for EP Application No. 15163075.3, dated Aug. 31, 2015, 3 pp.

*Primary Examiner* — Hezron E Williams
*Assistant Examiner* — Timothy Graves
(74) *Attorney, Agent, or Firm* — Fishman Stewart PLLC

(57) ABSTRACT

An improved system, apparatus and method for estimating thrust from an engine, and more specifically, a system for estimating thrust from strain gauge and accelerometer measurements. At least one strain gauge is mounted on an engine mount to measure strain to estimate a constant velocity or steady-state portion of thrust. At least one accelerometer is mounted on the vehicle to measure acceleration to estimate a transient portion of thrust. Steady-state thrust estimation and transient thrust estimation are combined to estimate thrust from the engine. An algorithm provides steps for estimating thrust from strain gauge and accelerometer measurements.

20 Claims, 4 Drawing Sheets

(51) Int. Cl.
  *F01D 21/00* (2006.01)
  *F01D 25/28* (2006.01)
  *F02C 9/28* (2006.01)
  *F02C 9/32* (2006.01)
  *G01L 1/22* (2006.01)
  *G01P 15/02* (2013.01)

(52) U.S. Cl.
  CPC .. *F05D 2270/051* (2013.01); *F05D 2270/331* (2013.01); *F05D 2270/807* (2013.01); *F05D 2270/808* (2013.01)

(56) References Cited

U.S. PATENT DOCUMENTS

| | | | |
|---|---|---|---|
| 4,506,551 A * | 3/1985 | Ray | G01H 1/00 340/683 |
| 4,788,855 A | 12/1988 | Laskody | |
| 4,967,550 A | 11/1990 | Acton et al. | |
| 5,005,353 A | 4/1991 | Acton et al. | |
| 5,285,638 A | 2/1994 | Russ et al. | |
| 5,319,922 A | 6/1994 | Brantley | |
| 5,385,013 A | 1/1995 | Barron et al. | |
| 6,138,081 A | 10/2000 | Olejack et al. | |
| 6,584,849 B2 | 7/2003 | Loftus et al. | |
| 6,904,340 B2 * | 6/2005 | Andre | B60L 15/2045 244/234 |
| 8,223,036 B2 | 7/2012 | Mitchell et al. | |
| 8,417,433 B2 | 4/2013 | Gauthier et al. | |
| 2008/0127734 A1 * | 6/2008 | van der Merwe | G01H 1/003 73/660 |
| 2009/0301055 A1 | 12/2009 | Kallappa | |
| 2011/0067501 A1 * | 3/2011 | Lafont | G01L 5/133 73/862.045 |
| 2011/0173990 A1 | 7/2011 | Thies | |
| 2013/0091856 A1 | 4/2013 | Race | |

* cited by examiner

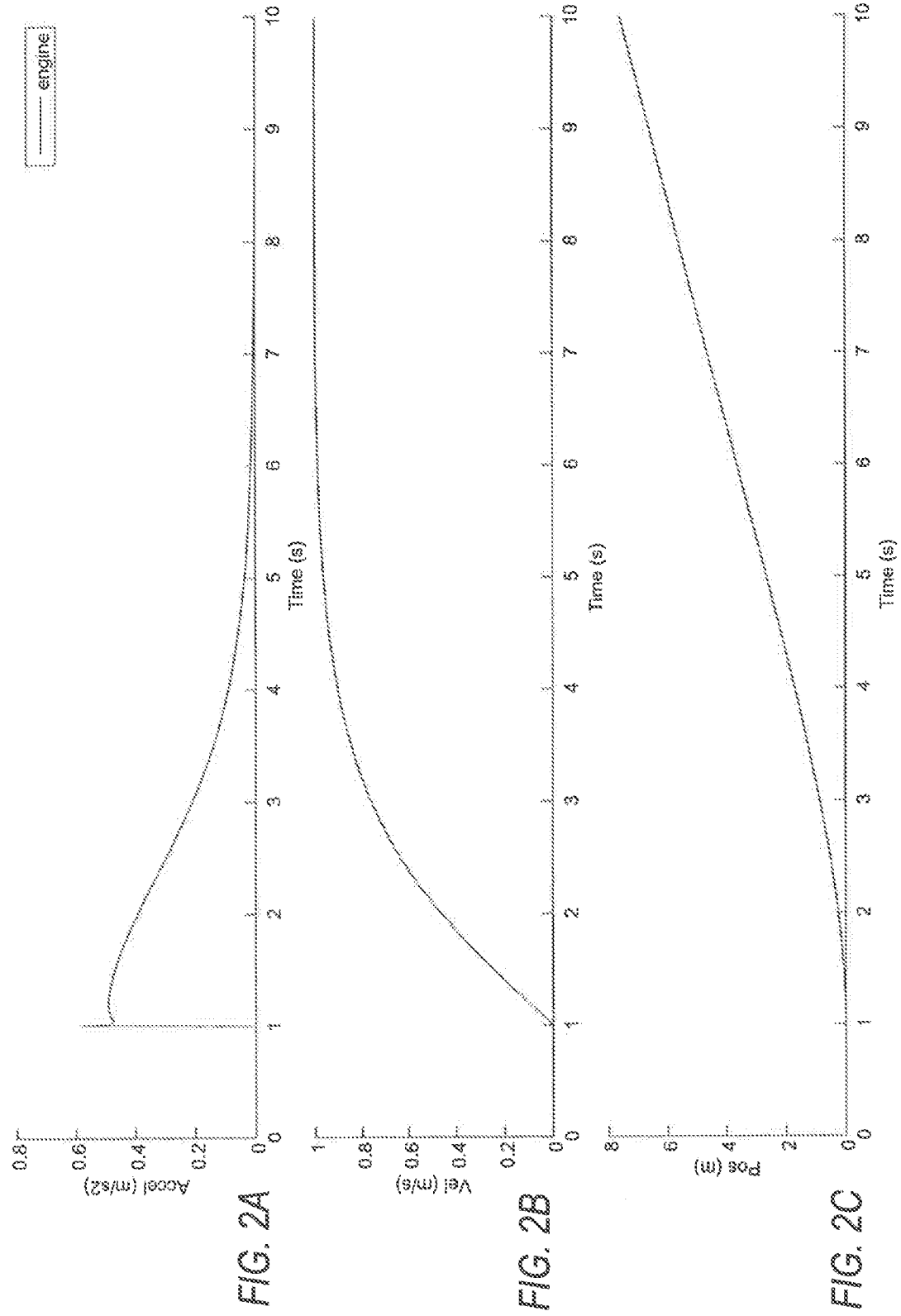

STRAIN GAUGE AND ACCELEROMETER MEASUREMENT FOR THRUST ESTIMATION

CROSS-REFERENCE TO RELATED APPLICATIONS

This application claims priority to U.S. Provisional Patent Application No. 61/978,352, filed Apr. 11, 2014, the contents of which are hereby incorporated in their entirety.

FIELD OF TECHNOLOGY

An improved system for estimating thrust from an engine, and more specifically, a system for estimating thrust from strain gauge and accelerometer measurements.

BACKGROUND

Gas turbine engines are used extensively in commercial aerospace industries as they provide efficient propulsion machinery for propelling airplanes and other aircraft. As the gas turbine operates at different operational cycles, for example during take-off, in-flight maneuvering, and deceleration for landing, the thrust curve will fluctuate based upon, in part, the performance and environmental demands that are placed on the aircraft. Engine health monitoring and calculating current thrust loads on the aircraft therefor are important for many reasons, not the least of which so as to aid in the understanding of current operating conditions as well as to provide predictability of future performance demand requirements.

There are many other reasons why it is desirable to be able to estimate thrust from an engine. Thrust estimation can be used to measure the mechanical conditions for example a damaged propeller, damage fan or degraded engine. When the engine controller looks only to throttle settings, safety is obviously a concern. It is easy to measure thrust of an engine running on a test bed however; it has been proved difficult to measure thrust of an engine installed in a vehicle. The current proposal helps address this concern.

Systems for estimating thrust that use measured parameters such as pressure and temperature at various points in the engine and the speed of rotation of each of the spools in the engine are very complex and are still not very accurate because of large random variations in these parameters which occur within the engine. These variations make it very difficult to relate the simultaneous values of different parameters or the same parameter at two different points in an engine in order to calculate the thrust being produced by an engine, and as a result the derivation of thrust is complex and unreliable.

Notwithstanding, the thrust from an engine in one method is estimated by complex engine models using several parameters, including measurements of temperature and pressure. However, as discussed herein, temperature does not result in thrust and pressure does not necessarily result in thrust either. These complex models require expensive and delicate computers and often the onboard controller is not capable of running such models. As a result the models are simplified to be approximately related to a few parameters or maybe the ratio of a few parameters or even just a single parameter to estimate thrust. Some control systems reduce thrust to a simple functional shaft speed, or pressure ratios in the engine or pressure ratios weighted by temperatures. When a pilot or autopilot pushes the power level forward, the system looks for more of that single parameter. The result is that thrust is not well quantified and may require different throttle settings to achieve the same thrust on different days.

Another concern is the autopilot maybe not be well tuned for certain flight conditions and would result in the autopilot searching for a throttle setting, constantly increasing and decreasing the throttle, as the engine controller overestimates the amount of fuel required to provide certain additional thrust. There are of course additional considerations.

By not allowing for accurate estimations during transient conditions, an algorithm could incorrectly perceive the increase or decrease in thrust during a bank turn or when the aircraft experiences a head wind. In these situations the control system might be incorrectly adjusted during transient conditions, for example a bank. If an engine health monitoring system were used with such a system it could inaccurately flag an engine as needing repair. Therefore, it would be desirable to provide a method and system for estimating thrust during steady-state and transient conditions.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 2a is a normalized graph of engine translation acceleration as a function of time for a vehicle powered by an engine;

FIG. 2b is a normalized graph of engine translation speed as a function of time for a vehicle powered by an engine;

FIG. 2c is a graph of engine position as a function of time for an engine powering a vehicle;

DETAILED DESCRIPTION

Figure 1:
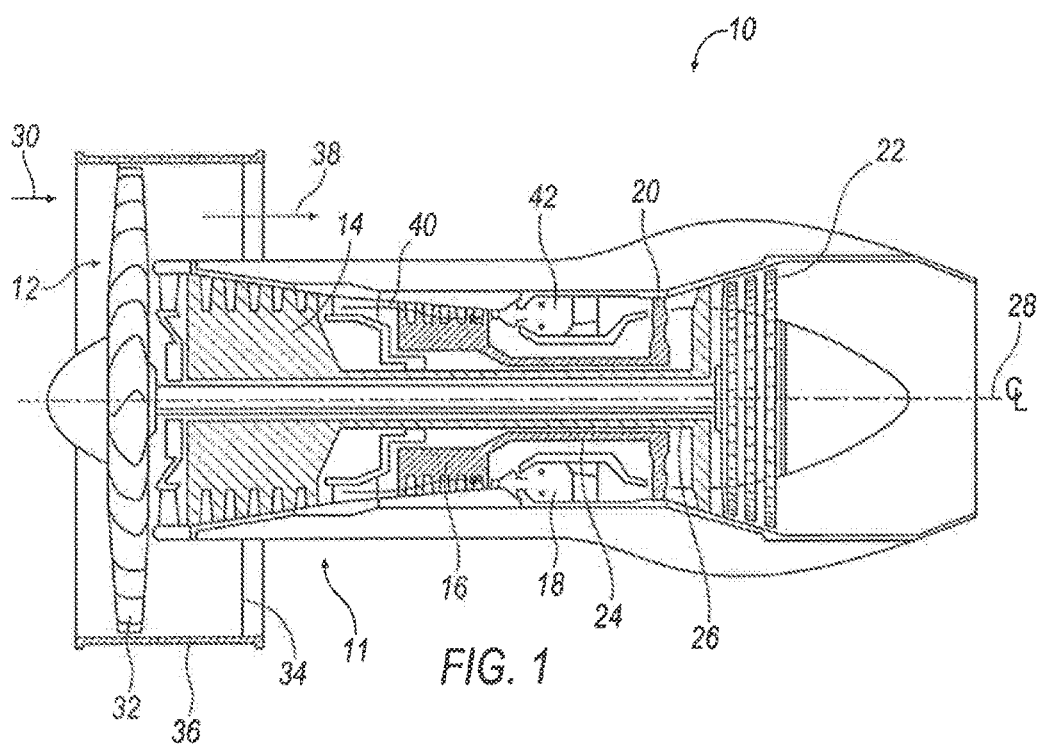
FIG. 1 illustrates an exemplary gas turbine engine.

Exemplary illustrations of the improved system, apparatus and method for estimating thrust from an engine, and more specifically, a system for estimating thrust from strain gauge and accelerometer measurements. At least one strain gauge is mounted on an engine mount to measure strain to estimate a steady-state portion of thrust. At least one accelerometer is mounted on the vehicle to measure acceleration to estimate a transient portion of thrust. Steady-state thrust estimation and transient thrust estimation are combined to estimate thrust from the engine. An algorithm provides steps for estimating thrust from strain gauge and accelerometer measurements.

For the purposes of promoting an understanding of the principles of the embodiments, reference will now be made to the embodiments illustrated in the drawings and specific language will be used to describe the same. It will nevertheless be understood that no limitation of the scope of the embodiments is thereby intended. Any alterations and further modifications in the described embodiments, and any further applications of the principles of the embodiments as described herein are contemplated as would normally occur to one skilled in the art to which the embodiment relates. It should be understood that any engine capable of producing thrust would be contemplated to fit within the scope of the embodiments disclosed herein, including, but not limited to, rocket, gas turbine, propeller, turbo fan, impeller or magneto hydrodynamic engines.

FIG. 1 illustrates a gas turbofan engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28. It will be appreciated that an exemplary embodiment is shown in the context of a gas turbofan engine 10. However, it will be appreciated that the embodiments herein are not limited to gas turbofans 10, but instead can be used with a plethora of other propulsion devices.

Ambient air 30 enters the fan 12 and is directed across a fan rotor 32 in an annular fan bypass duct 34, which in part is circumscribed by nacelle 36. The bypass airflow 38 provides engine thrust while the primary gas stream 40 is directed to the combustor 18 and the high pressure turbine 20. During operation, the core engine powers the fan 12 which pressurizes ambient air 30 to produce propulsion thrust in the fan air 38 bypassing the core engine and discharged from the fan exhaust nozzle (not shown).

An algorithm combines steady-state and transient measurements to determine an estimation of thrust from an engine. By adding the steady-state portion and transient portion of thrust the algorithm is able to estimate thrust. When an engine produces thrust, which is a force, the thrust is offset by forces working against it: drag force, structural stiffness and structural damping.

The drag force is a function of velocity and works against the vehicle being moved by the thrust. At steady-state, the force created by the engine is offset by drag and therefore the thrust may be measured by strain gauge measurements at an engine mount. Deformation of structural members, such as an engine mount, is displacement and displacement multiplied by structural stiffness is structural stiffness force. The structural stiffness force is the result of the drag force counteracting thrust and may be measured in the engine mount as strain in the structural member. At steady-state the measured strain may be used to provide an accurate estimate of the engine thrust.

The structural damping force occurs when there is relative motion between two points on a structure, which for purposes of the present illustration, occur between an engine and a point on the body of the vehicle. The velocity between the engine and the fuselage, for example, and a structural damping component will create a structural damping force.

None of the aforementioned forces account for transient conditions, such as acceleration, banking, or head winds. On a take-off roll of an aircraft, for example, acceleration is initially high and velocity is low, although actual thrust is high. By measuring acceleration, a transient component of thrust may be estimated.

Referring now to FIG. 2A, a normalized graph of acceleration as a function of time for an engine powering a vehicle 10 is shown. The graph is a simulation of acceleration of an aircraft during take-off roll where the engine suddenly applies thrust as a step input at a time of 1 second after the simulation beings (T=1). The engine suddenly accelerates from its resting position due to lack of structural stiffness force counteracting it. Referring now to FIG. 2B, a normalized graph of velocity as a function of time for an engine powering a vehicle 10 is shown. The graph shown in FIG. 2B is a simulation of velocity of an engine where the engine suddenly applies thrust as a step input at T=1. As normalized velocity reaches 1, acceleration of FIG. 2A goes to 0.

Figure 2D:
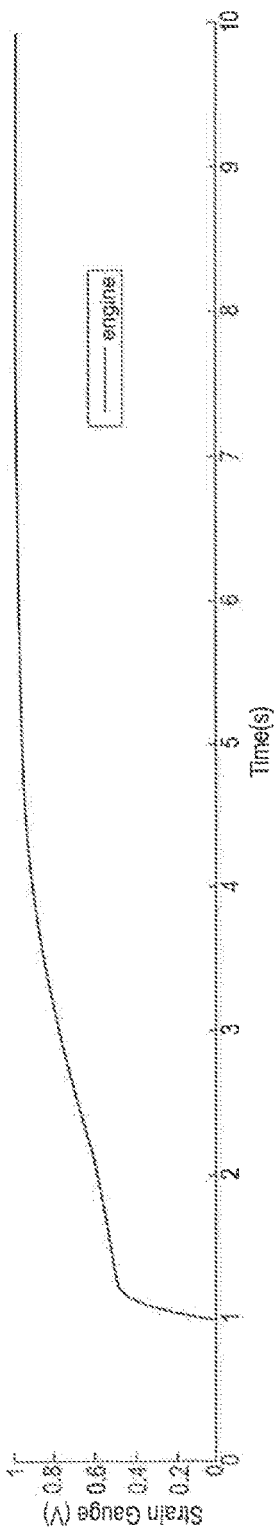
FIG. 2d is a normalized graph of strain gauge voltage as a function of time for a strain gauge mounted on a structural member connecting the engine to the vehicle.
Figure 2E:
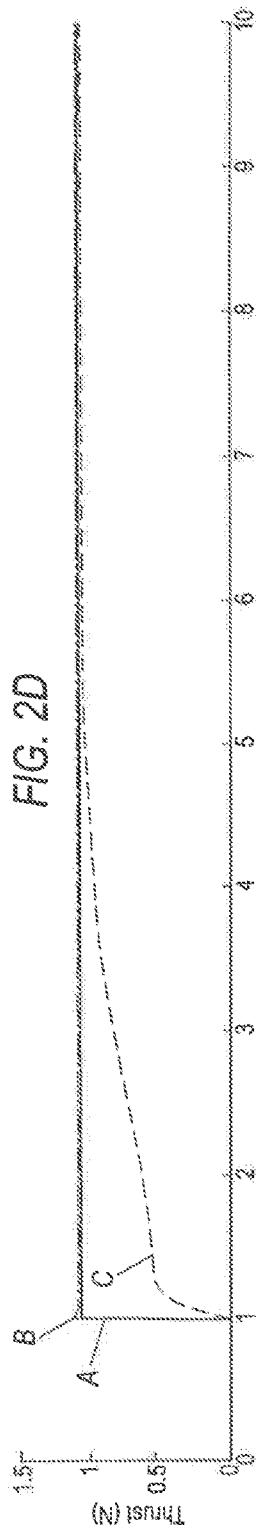
FIG. 2e is a normalized graph of true thrust, estimated thrust using strain gauges only, and then estimated using strain gauges and accelerometers as a function of time for an engine powering a vehicle.

Referring now to FIG. 2C, a graph of vehicle position as a function of time for a vehicle powered by an engine is shown. Referring now to FIG. 2D, a normalized graph of strain gauge voltage as a function of time for a vehicle powered by an engine is shown. The deformation of the engine mount increases as the velocity of the plane increases until the normalized velocity of the plane reaches 1. Referring now to FIG. 2E, a normalized graph (A) of true thrust is shown in solid line where it rises to a value of 1 at T=1, thus forming the step input of thrust at T=1. An estimated thrust line (C) using only strain gauges are shown in elongated dashed lines. The estimated thrust line (C) may rise slightly but it stops short of the true thrust line (A) due to the non-zero acceleration. As time progresses and acceleration drops to zero, the estimated thrust from a strain gauge only estimator approaches the actual value of 1. An estimated thrust line (B) using strain gauges and accelerometers are shown by long and short dashes. The estimated thrust line (B) draws near the true thrust line (A) much more quickly than the estimate from a strain gauge only system. This ability to accurately estimate true thrust during non-zero accelerations exemplifies the advantage created by the use of the strain gauges and accelerometers working in concert with one another.

Figure 2F:
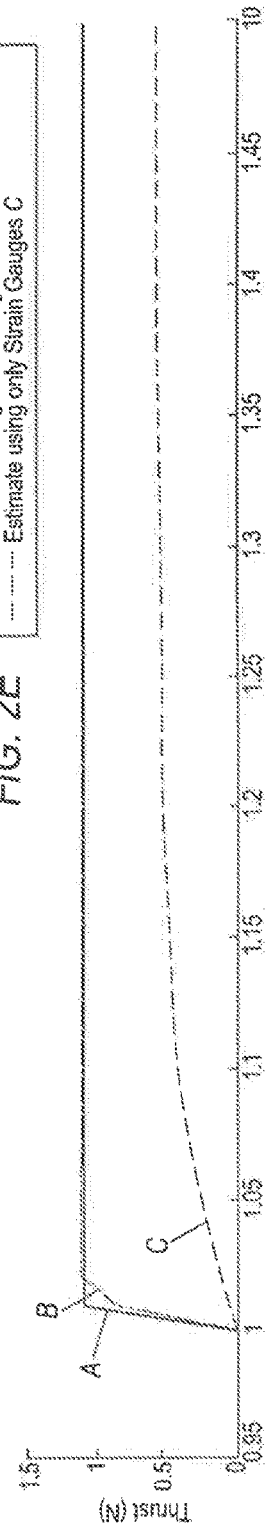
FIG. 2f is a graph showing closeness of the strain gauges and accelerometer graph relative to the true thrust line graph.
Figure 2G:
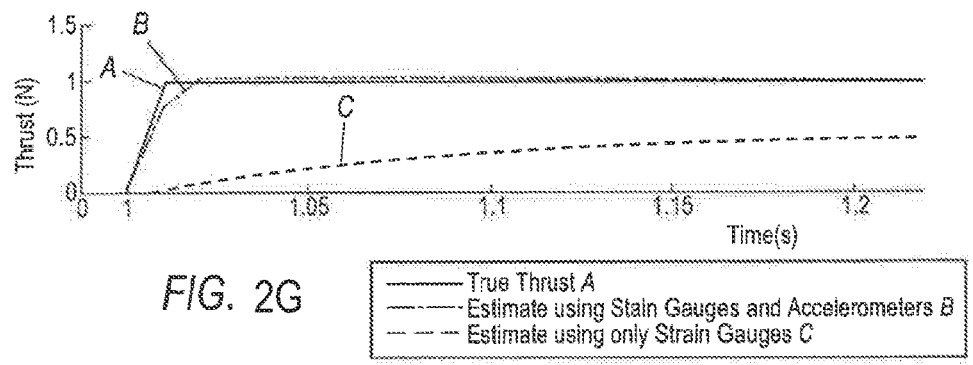
FIG. 2g is an enlarged graph of the FIG. 2f graph, showing the closeness of the strain gauges and accelerometers graph relative to the true thrust line graph.

FIG. 2F is an enlarged representation of the FIG. 2E graphical representation. Here the estimated thrust line (B) when using strain gauges and accelerometers is shown nearly approximate to the true thrust line (A). As it can be seen, by adding acceleration to the strain gauge measurement, an accurate estimation of thrust during times of non-zero acceleration may be calculated which is very close to the true thrust line.

Figure 3:
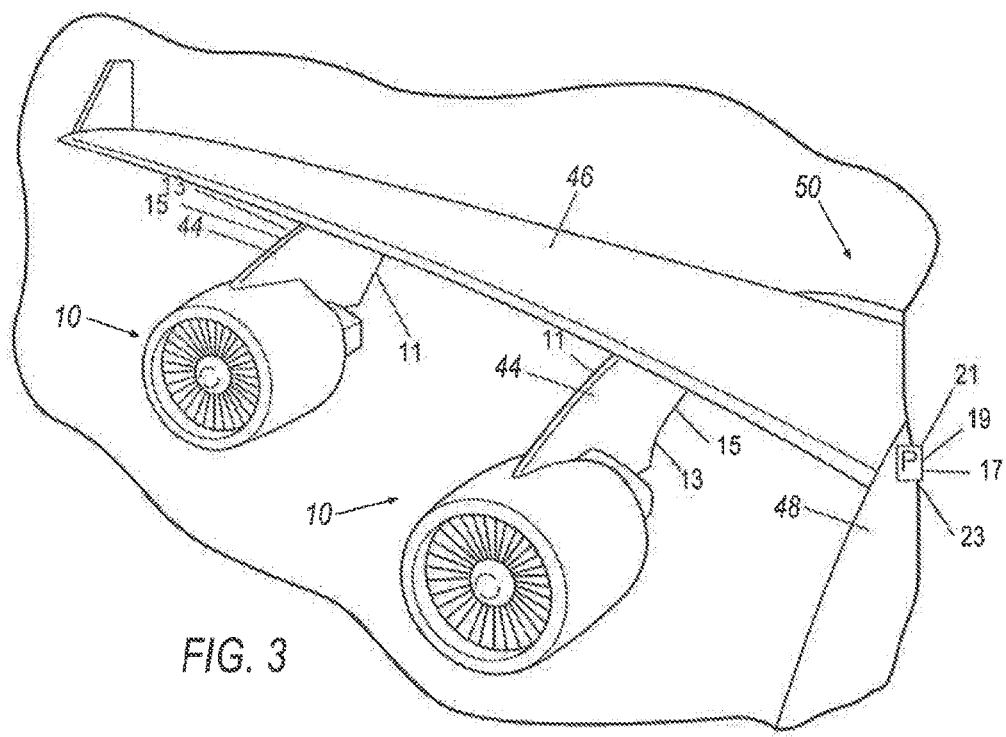
FIG. 3 illustrates exemplary engine mounted to a fuselage.

Referring now also to FIG. 3, an illustration shows an exemplary engine 10 mounted to a vehicle 50 by an engine mount 44. It will be appreciated that while a vehicle 50 is shown as an aircraft, that the vehicle could also be a marine, land, locomotive or other machine where measuring thrust is of relevance. In this present exemplary embodiment, the vehicle 50 includes a body, such as a fuselage or hull of a watercraft. In the present embodiment the body is a fuselage 48. The system 11 of the present disclosure comprises an engine 10 attached to a vehicle 50 by at least one engine mount 44 and at least one strain gauge 13 and at least one accelerometer 15. At least one strain gauge is mounted on the engine mount 44. It is within the scope of the present embodiment to mount a plurality of strain gauges on the engine mount 44 and decompose the signals to arrive at a single strain gauge value or a 3-dimensional strain gauge value. Additionally, it should be understood that it is within the scope of the present embodiment that a sheer gauge may be substituted for a strain gauge. The strain gauge measures the deformation of the engine mount 44 and produces a signal, usually in the form of a voltage, as a function of the deformation of the engine mount 44. As a strain is a dimensionless measurement, stress is inferred from the strain signal, or another way of looking at it the strain sensor produces a signal indicative of stress.

At least one accelerometer 15 for producing a signal indicative of acceleration is mounted on the vehicle 50. One example of a suitable accelerometer is a 3-axis MEMS accelerometer. In one embodiment the system 11 employs an accelerometer 15 that is located in an engine 10. In one embodiment a second accelerometer 15 is located in an engine 10. The accelerometer 15 may be located on one or more engines 10 or at other locations upon the vehicle 50. In one embodiment the accelerometer 15 is mounted to the body of the vehicle 50.

In one embodiment the algorithm 23 is in the form of a code segment 19 containing instructions 21 to estimate thrust from strain gage signals and acceleration signals. In one embodiment at least one processor 17 is in communication with the strain gauge 13 and accelerometer 15 for executing instructions 21 to estimate thrust from strain gauge signals and acceleration signals. In one embodiment the algorithm 23 estimates a transient portion of thrust by converting accelerometer signals measured acceleration. In one embodiment, a transient portion of thrust it is estimated by multiplying a mass by measured acceleration.

In one embodiment, the algorithm 23 combines steady-state measurements and transient measurements to calculate total thrust. In one embodiment the algorithm 23 estimates the steady-state portion of thrust from strain gauge signals and in another embodiment the algorithm 23 further includes the stiffness of the engine mount 44 in the estimation of thrust. In one embodiment the estimate of steady-state thrust is a measurement of drag force on the vehicle 50. The algorithm 23 may also run on the same processor 17 as the engine health monitoring system 11. In addition, the thrust measurements could be used in the engine health monitoring system 11 to make engine readings more reliable. If the vehicle is in a transient state, banking, accelerating, or decelerating, the strain gauges may be inaccurate and if acceleration is known the transients that are affecting the strain gauge measurements may be corrected.

A method for estimating thrust comprises determining whether the strain gauge or accelerometer requires calibration. After calibration, if required, signals from the strain gauge and accelerometer are obtained. Strain in the engine mount 44 is measured and acceleration of at least one point of the vehicle is measured. A steady-state portion of thrust is estimated from the strain measurement and a transient portion of thrust is estimated from the acceleration. An algorithm 23 is applied to estimate thrust from the strain measurements and acceleration measurements. In one embodiment the algorithm 23 adds the steady-state portion of thrust to the transient portion of thrust to estimate engine thrust. In one embodiment the algorithm 23 estimates the transient portion of thrust from engine 10 and/or vehicle mass and measured acceleration. In one embodiment the algorithm 23 estimates the steady-state portion of thrust from strain gauge measurements. In another embodiment the algorithm 23 estimates the steady-state portion of thrust from strain gauge measurements and stiffness of the engine mount 44.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A system for estimating thrust from an engine, comprising: a vehicle having a propulsion device that is capable of producing thrust, said propulsion device is attached by at least one mounting structure; a plurality of strain gauges mounted on said mounting structure, said strain gauges for producing strain gauge signals indicative of stress; at least one accelerometer mounted on one of said propulsion device or vehicle, said accelerometer producing a signal indicative of acceleration; and at least one processor in communication with said plurality of strain gauges and accelerometer for executing instructions to estimate thrust from strain gauge signals and said acceleration signals, wherein the at least one processor decomposes the strain gauge signals to arrive at a single strain gauge value or a 3-dimensional strain gauge value.

2. The system for estimating thrust as set forth in claim 1, wherein said instructions estimate a transient portion of thrust by converting accelerometer signals to measured acceleration.

3. The system for estimating thrust as set forth in claim 2, wherein the transient portion of thrust is estimated by multiplying a mass by measured acceleration.

4. The system for estimating thrust as set forth in claim 1, wherein said accelerometer is located on said propulsion device.

5. The system for estimating thrust as set forth in claim 1, wherein said vehicle includes a body and said accelerometer is mounted on the body of the vehicle.

6. The system for estimating thrust as set forth in claim 5, wherein said body is a fuselage.

7. The system for estimating thrust as set forth in claim 5, further comprising a second accelerometer located on the propulsion device.

8. A system for estimating thrust from an engine, comprising: a vehicle having an engine capable of producing thrust, said engine attached by at least one mounting member; a plurality of strain gauges mounted on said engine mount, wherein said strain gauges produce signals indicative of stress; at least one accelerometer mounted on said vehicle, said accelerometer producing a signal indicative of acceleration; and at least one processor in communication with said plurality of strain gauges and said accelerometer for estimating thrust from the strain gauge signals and the acceleration signals according to an algorithm, wherein the at least one processor decomposes the strain gauge signals to arrive at a single strain gauge value or a 3-dimensional strain gauge value.

9. The system for estimating thrust as set forth in claim 8, wherein said algorithm adds steady state measurements and transient measurements to calculate total thrust.

10. The system for estimating thrust as set forth in claim 9, wherein the algorithm estimates a transient portion of thrust from accelerometer signals.

11. The system for estimating thrust as set forth in claim 10, wherein the algorithm estimates the transient portion of thrust by multiplying mass by measured acceleration.

12. The system for estimating thrust as set forth in claim 9, wherein the algorithm estimates a steady state portion of thrust from the strain gauge signals.

13. The system for estimating thrust as set forth in claim 12, wherein said algorithm estimates the steady state portion of thrust from the strain gauge signals and stiffness of said engine mount.

14. The system for estimating thrust as set forth in claim 12, wherein said estimate of steady state thrust uses an estimate of drag force on said vehicle.

15. A method for estimating thrust from an engine attached to a vehicle, comprising:
 measuring strain, via a plurality of strain gauges, in an engine mount to produce strain gauge signals indicative of stress,
 decomposing the strain gauge signals to arrive at a single strain gauge value or a 3-dimensional strain gauge value;
 measuring acceleration, via at least one accelerometer, of at least one point of the vehicle to obtain an acceleration measurement;
 estimating a constant velocity portion of thrust from the single strain gauge value or the 3-dimensional strain gauge value; and
 estimating a transient portion of thrust from the acceleration measurement.

16. The method for estimating thrust from an engine as set forth in claim 15, further comprising the step of applying an algorithm to the strain measurements and acceleration measurements to estimate thrust.

17. The method for estimating thrust from an engine as set forth in claim 16, wherein the algorithm adds the constant velocity portion of thrust to the transient portion of thrust to estimate overall thrust.

18. The method for estimating thrust from an engine as set forth in claim 16, wherein the algorithm estimates the transient portion of thrust from vehicle mass and measured acceleration.

19. The method for estimating thrust from an engine as set forth in claim 16, wherein the algorithm estimates the constant velocity portion of thrust from strain gauge measurements.

20. The method for estimating thrust from an engine as set forth in claim 16, wherein the algorithm estimates the constant velocity portion of thrust from strain gauge measurements and stiffness of the engine mount.

* * * * *